United States Patent
Pont et al.

(10) Patent No.: US 10,154,293 B2
(45) Date of Patent: Dec. 11, 2018

(54) CROWDSOURCED PLAYBACK CONTROL OF MEDIA CONTENT

(71) Applicant: OpenTV, Inc., San Francisco, CA (US)

(72) Inventors: Jose Emmanuel Pont, Lonay (CH); Crx K. Chai, Oakland, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

(21) Appl. No.: 15/283,002

(22) Filed: Sep. 30, 2016

(65) Prior Publication Data

US 2018/0098101 A1    Apr. 5, 2018

(51) Int. Cl.
*H04H 60/33*       (2008.01)
*H04N 7/173*       (2011.01)
*H04N 21/2387*     (2011.01)
*H04N 21/442*      (2011.01)
*H04N 21/24*       (2011.01)
*H04N 21/2187*     (2011.01)
*H04N 21/235*      (2011.01)
*H04N 21/472*      (2011.01)
*H04N 21/84*       (2011.01)
(Continued)

(52) U.S. Cl.
CPC ..... *H04N 21/2387* (2013.01); *H04N 21/2187* (2013.01); *H04N 21/235* (2013.01); *H04N 21/2408* (2013.01); *H04N 21/44222* (2013.01); *H04N 21/4532* (2013.01); *H04N 21/47217* (2013.01); *H04N 21/4825* (2013.01); *H04N 21/84* (2013.01); *H04N 21/8586* (2013.01)

(58) Field of Classification Search
CPC ............. H04N 21/238; H04N 21/2387; H04N 21/2408; H04N 21/25891; H04N 21/442; H04N 21/44204; H04N 21/44222; H04N 21/47217
See application file for complete search history.

(56) References Cited

U.S. PATENT DOCUMENTS 7,614,064 B2 * 11/2009 Zigmond ............... H04H 60/31
                                                              725/13
8,768,146 B2 *  7/2014 Wagner .................. H04N 5/782
                                                              386/278

(Continued)

OTHER PUBLICATIONS

"International Application Serial No. PCT/US2017/049141, International Search Report dated Nov. 16, 2017", 2 pgs.

(Continued)

*Primary Examiner* — James R Sheleheda
(74) *Attorney, Agent, or Firm* — Schwegman Lundberg & Woessner, P.A.

(57) ABSTRACT

Example embodiments provide systems and methods for crowdsourced skipping of media content portions. In an example method, a plurality of content tags are received from a plurality of media content devices over a communication network. Each of the plurality of content tags may designate a location within a media content item. The content tags are processed to generate aggregated content tags for the media content item. The aggregated content tags may designate one or more portions of the media content item for modified playback. The aggregated content tags for the media content item are transmitted over the communication network to a first media content device separate from the plurality of media content devices.

30 Claims, 9 Drawing Sheets

(51) Int. Cl.
*H04N 21/45* (2011.01)
*H04N 21/482* (2011.01)
*H04N 21/858* (2011.01)

(56) References Cited

U.S. PATENT DOCUMENTS

| | | | |
|---|---|---|---|
| 8,954,852 B2* | 2/2015 | Oetzel | G06F 3/04855 |
| | | | 348/734 |
| 9,270,563 B1* | 2/2016 | Brouillette | H04L 43/0876 |
| 9,361,353 B1* | 6/2016 | Aristides | G06F 17/30828 |
| 9,372,604 B2* | 6/2016 | Oetzel | G06F 3/04855 |
| 9,479,836 B2* | 10/2016 | Adimatyam | H04N 21/482 |
| 2004/0045020 A1* | 3/2004 | Witt | H04N 7/163 |
| | | | 725/13 |
| 2007/0092204 A1* | 4/2007 | Wagner | H04N 5/782 |
| | | | 386/241 |
| 2007/0198111 A1* | 8/2007 | Oetzel | G06F 3/04855 |
| | | | 700/94 |
| 2011/0041069 A1* | 2/2011 | Carletti | G06F 8/34 |
| | | | 715/738 |
| 2012/0030263 A1 | 2/2012 | John et al. | |
| 2013/0046773 A1 | 2/2013 | Kannan et al. | |
| 2014/0064706 A1 | 3/2014 | Lewis, II | |
| 2014/0067936 A1 | 3/2014 | Seligmann et al. | |
| 2014/0074655 A1* | 3/2014 | Lim | G06O 20/32 |
| | | | 705/26.35 |
| 2014/0074855 A1 | 3/2014 | Zhao et al. | |
| 2015/0082338 A1* | 3/2015 | Logan | A23L 2/52 |
| | | | 725/32 |
| 2015/0135074 A1* | 5/2015 | Oetzel | G06F 3/04855 |
| | | | 715/716 |
| 2015/0278232 A1* | 10/2015 | Shahraray | G06F 17/30884 |
| | | | 707/756 |
| 2015/0326934 A1* | 11/2015 | Gravino | H04N 21/4622 |
| | | | 725/25 |
| 2015/0356692 A1* | 12/2015 | Shelford | G06Q 50/01 |
| | | | 705/7.13 |
| 2016/0005440 A1* | 1/2016 | Gower | H04N 21/4756 |
| | | | 386/241 |
| 2016/0259681 A1* | 9/2016 | Oetzel | G06F 3/04855 |
| 2017/0006252 A1* | 1/2017 | Patel | H04N 5/783 |
| 2017/0193103 A1* | 7/2017 | Shahraray | G06F 17/30884 |
| 2017/0332120 A1* | 11/2017 | Maynard | H04N 21/266 |

OTHER PUBLICATIONS

"International Application Serial No. PCT/US2017/049141, Written Opinion dated Nov. 16, 2017", 8 pgs.

* cited by examiner

| CONTENT TAG DATABASE 204 | | | |
|---|---|---|---|
| DEVICE ID 502 | PROGRAM/ CHANNEL ID 504 | TAG INDICATION 506 | LOCATION/ TIMESTAMP 508 |
| ⋮ | ⋮ | ⋮ | ⋮ |

FIG. 5

| AGGREGATED CONTENT TAG DATABASE 208 | | | | |
|---|---|---|---|---|
| PROGRAM/ CHANNEL ID 602 | STARTING LOCATION/ TIMESTAMP 604 | ENDING LOCATION/ TIMESTAMP 606 | PLAYBACK CONTROL 608 | GENRE/ RATING INFO 610 |
| ⋮ | ⋮ | ⋮ | ⋮ | ⋮ |

FIG. 6

| CONTENT POPULARITY DATABASE 216 | | | |
|---|---|---|---|
| PROGRAM/ CHANNEL ID 702 | CONTENT PORTION ID 704 | CONTENT PORTION LOCATION/ TIMESTAMP 706 | RATING INFO 708 |
| ⋮ | ⋮ | ⋮ | ⋮ |

FIG. 7

CROWDSOURCED PLAYBACK CONTROL OF MEDIA CONTENT

FIELD

The present disclosure relates generally to the presentation of media content and, in a specific example embodiment, to playback control of media content using crowd sourcing.

BACKGROUND

While a sizeable amount of media content continues to be consumed by viewers and listeners "live" (e.g., as the media content is being received from a media content source by way of terrestrial antenna broadcast, direct satellite broadcast, Internet streaming, and so on), some significant volume of media content is recorded or stored for subsequent viewing, often after first being broadcast or otherwise presented to one or more other viewers. Such media content may be received and stored either locally (e.g., on a personal video recorder (PVR) or digital video recorder (DVR), on a magnetic or optical disk drive, on a flash drive, or the like), or remotely (e.g., on a server, database, or other data storage device or system accessible via a communication network).

Oftentimes, an item of media content (e.g., a movie, television episode, news program, sporting event, or the like) includes one or more portions (e.g., advertisements during television shows, timeouts and intermissions during sports, sections of potentially objectionable content during movies, and so on) that at least some viewers may desire to skip while playing back the media content item. In other cases, a media content item includes one or more portions exceptionally dramatic movie scenes, exciting sports plays, and the like) that some viewers especially enjoy.

BRIEF DESCRIPTION OF DRAWINGS

Various ones of the appended drawings merely illustrate example embodiments of the present disclosure and cannot be considered as limiting in scope.

FIG. 5 is graphical depiction of an example content tag database of the media content playback control system of FIG. 2.

FIG. 6 is graphical depiction of an example aggregated content tag database of the media content playback control system of FIG. 2.

FIG. 7 is a graphical depiction of an example content popularity database of the media content playback control system of FIG. 2.

DETAILED DESCRIPTION

In the following description, for the purposes of explanation, numerous specific details are set forth in order to provide an understanding of various example embodiments of the present subject matter. It will be evident, however, to those skilled in the art, that example embodiments of the present subject matter may be practiced without these specific details.

Figure 1:
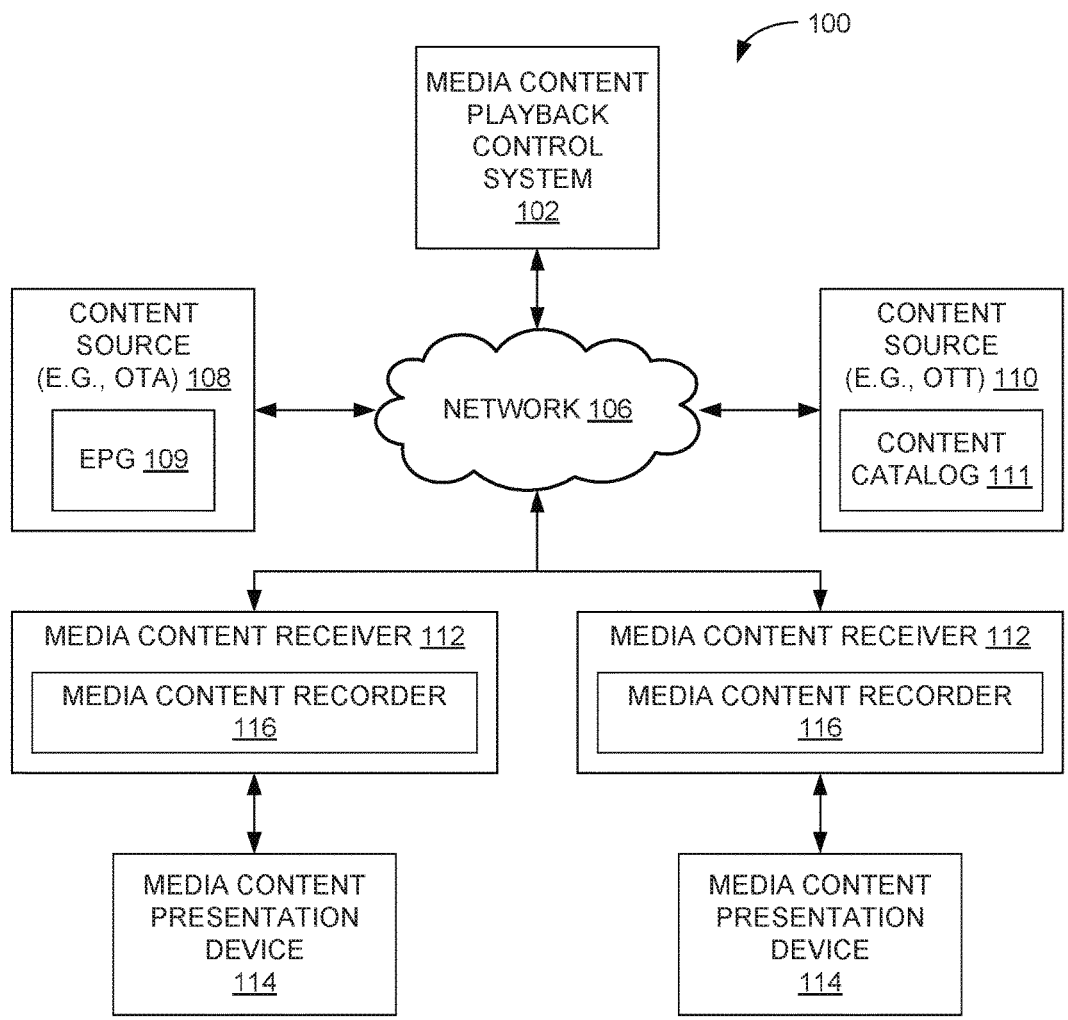
FIG. 1 is a block diagram of an example media content system including an example media content playback control system and an example media content receiver.

FIG. 1 is a block diagram of an example media content system 100 including an example media content playback control system 102 and one or more example media content receivers 112. The media content system 100 may also include one or more sources 108, 110 of media content. In example embodiments, the media content distributed within the media content system 100 may include audio data, video data, or both. Further, the media content may be organized into separate media content items, such as television programs, movies, video clips, individual songs, and the like. The media content sources 108, 110 may transmit media content items over a network 106 to one or more media content receivers 112. In example embodiments, the network 106 may be a wide-area network (WAN) (e.g., the Internet), a cellular network (e.g., third-generation (3G) or fourth-generation (4G) network), a cable television network, a satellite communication network, or any other communication network or connection suitable for carrying the media content items, or combinations thereof.

The content sources 108, 110 may be any devices or systems that generate and transmit media content items via the network 106 to the media content receivers 112, or that act as distributing systems for media content items that are generated by other devices, systems, or entities not explicitly shown in FIG. 1. As shown in FIG. 1, a first content source 108 may be an over-the-air (OTA) television content source 108 (e.g., a local television station, a broadcast television network, and so on), a cable television content source, a satellite television content source (e.g., a direct-broadcast satellite (DBS) system), or any other content source that may provide one or more channels or streams of media content items to the media content receivers 112 via the network 106. Such a content source 108 may also provide an electronic program guide (EPG) 109 that includes information for viewers regarding the particular media content items to be transmitted on particular channels or streams, the timing of those transmissions, and the like.

A second content source 110 may be any device or system that provides media content items over the Internet or other widely accessible medium without requiring an intervening operator or system, such as a cable or satellite operator or system, for distribution of the media content items. In some example embodiments, the second content source 110 (e.g., a website for streaming audio clips, video programs, and so on) may provide a content catalog 111 that includes information for viewers regarding the particular media content items available, the terms (e.g., payment, available times, etc.) for accessing the media content items, and so on. Other types of media content item sources other than the content sources 108, 110 of FIG. 1 are also possible.

Each of the media content receivers 112 may be any system or device configured to receive one or more of the media contents items via the network 106 and present the media content items for display or presentation to one or more viewers. Examples of the media content receivers 112 may include, but are not limited to, televisions, smart televisions, television set-top boxes (STBs), streaming devices, gaming devices, desktop computers, laptop computers, tablet computers, smart phones, and so on. The media content receiver 112 may process the incoming media content items and provide the items for presentation to a viewer via a media content presentation device 114, which may be a television, computer monitor, audio receiver with speakers, or other device or system configured to present media content to a viewer. The presentation of the media content items may be "live" (e.g., as the media content items are received via the network 106). The processing of the media content items may include, for example, frequency conversion, decoding, decryption, error detection/correction, format conversion, and so on. While the media content presentation devices 114 are shown as separate devices from their corresponding media content receivers 112, the media content presentation devices 114 may be integrated within the media content receiver 112 in some example embodiments.

As depicted in FIG. 1, one or more of the media content receivers 112 may include a media content recorder 116, such as a personal video recorder (PVR) or digital video recorder (DVR), that may be configured to record one or more of the media content items received at the media content receiver 112 and store them for subsequent playback (e.g., at some point after the media content item has been received at the media content receiver 112). While the media content recorders 116 are shown as being integrated within their respective media content receivers 112, one or more of the media content recorders 116 may be separate from, but communicatively coupled to, their associated. media content receivers 112.

The media content playback control system 102 may be coupled with the content sources 108, 110 and the media content receivers 112 via the network 106. As is described in greater detail below, the media content playback control system 102 may receive information from multiple media content receivers 112 that indicates or designates portions of the media content items that were marked as either objectionable or desirable by the viewer. For example, a viewer may skip over one or more objectionable portions (e.g., commercials, sports event timeouts, or other undesirable segments) of a previously-recorded media content item by way of using one or more trick modes of the media content recorder 116 of the media content receiver 112, such as a fast-forward mode to begin skipping over an advertisement, followed by a play mode to resume normal playback of the media content item after the advertisement has been skipped. In another example, the viewer may only mark or otherwise designate (e.g., by way of a button of a remote control device provided for such a purpose) the beginning and end of portions of the media content item that are personally undesirable or objectionable to the viewer while the item is being played or presented live (e.g., as the media content receiver 112 is receiving the item via the network 106) to the viewer. Oppositely, the viewer may replay one or more desirable portions (e.g., notable sports plays, exciting movie scenes, and the like) of a media content item by using a rewind and subsequent play mode. In another example, the viewer may only mark or otherwise designate the beginning and end of portions of the media content item that are personally desirable. The marking information may include timestamps or other indications of locations within the media content item at which a portion to be skipped either begins or ends. The media content playback control system 102 may then aggregate or otherwise process that information to generate aggregated marking information that may then be provided to a different media content receiver 112, which may be configured to use the aggregated information to modify the playback of portions of a media content item (e.g., when presented to the viewer after being viewed by other viewers using other media content receivers 112). Such modifications may include, but not limited to, skipping, muting, or replaying the designated portions, presenting an alert (e.g., a visual icon) while playing the designated portions, playing only the designated portions, and so on.

As a result, at least some of the embodiments of the media content playback control system 102 and the media content receivers 112 discussed herein facilitate a type of "crowd-sourcing" of information useful for automatically skipping unpopular portions of media content items being viewed by users. Such information may take the form of one or more "tags" that indicate starting or ending locations within the media content items of the portions to be skipped. Moreover, in some example embodiments, the resulting skipping information may be processed and provided to media stakeholders, such as the content sources 108, 110 or other entities, as feedback regarding the popularity, or lack thereof, of the media content items, or portions thereof. In yet other example embodiments, some tags may indicate highly popular portions of media contents, which may be used to alert other viewers of those portions, as well as to provided positive feedback regarding those portions to one or more media stakeholders. Other aspects of various example embodiments of the media content playback control system 102 and other components of the media content system 100 are discussed more fully below.

Figure 2:
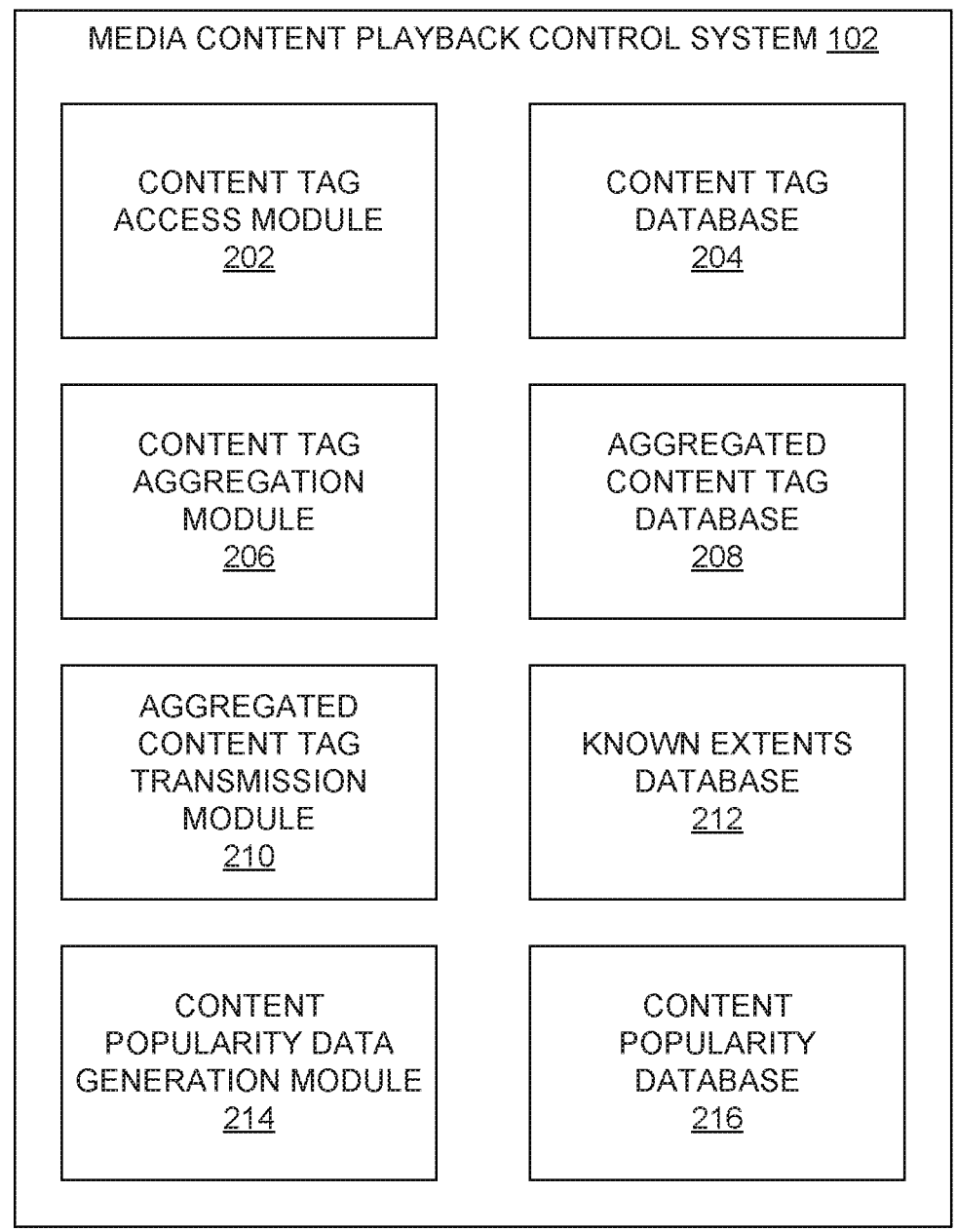
FIG. 2 is a block diagram of the example media content playback control system of FIG. 1.

FIG. 2 is a block diagram of the media content playback control system 102 of FIG. 1, according to an example embodiment. As shown in FIG. 2, the media content playback control system 102 may include one or more of a content tag access module 202, a content tag database 204, a content tag aggregation module 206, an aggregated content tag database 208, an aggregated content tag transmission module 210, a known extents database 212, a content popularity data generation module 214, and a content popularity database 216. In other example embodiments, one or more of the modules 202-216 of FIG. 2 may be omitted or combined with other modules, and one or more modules not explicitly discussed herein may be included within the media content playback control system 102. In some example embodiments, one or more of the modules 202-216 may include hardwired modules, one or more processors, associated memory that includes instructions executable by the one or more processors, or some combination thereof.

The content tag access module 202 may be configured to receive content tags generated at one or more of the media content receivers 112. In one example embodiment, each content tag may identify the particular media content item, as well as a starting location and/or an ending location of a portion of the media content item for which playback is to be modified. Additional information may be included in the tag as well. Other types or forms of the content tags may be utilized in other embodiments. Further, each media content receiver 112 may push its content tags associated with one or more media content items over the network 106 to the content tag access module 202. In other example embodiments, the content tag access module 202 may pull stored content tags from each of the media content receivers 112, such as periodically, on an as-needed basis, or according to some other schedule or event-driven scenario. The content tag access module 202 may then store the received content tags in the content tag database 204 over a period of time. An example of data stored in the content tag database 204 is discussed below in connection with FIG. 5.

As employed herein, a location is a timestamp, a frame number in the case of video content or other indication of a point in time during the playing of the media content item. Further, the extent of a portion of a media content item is defined by a starting location and an ending location within the media content item. For example, if the media content item is a video content item, a starting location of a portion of the video content item may be two minutes from the beginning of the video content item, and an ending location of the portion of the video content item may be three minutes from the beginning of the video content item, resulting in a portion that is one minute in length that extends from two minutes to three minutes from the beginning of the video content item.

In some example embodiments, the content tag access module 202 may also receive additional information related to the received content tags, such as rating information indicating a viewer's rating of the portion of the media content item marked for modified playback, a reason as to why the portion was marked, a genre or type (e.g., advertisement, sports event timeout, and the like) of the portion marked, and the like.

The content tag aggregation module 206 may then aggregate and/or otherwise process the content tags associated with a particular media content item that are stored in the content tag database 204 to generate one or more aggregated content tags, which may be stored in the aggregated content tag database 208. An example of the data stored in the aggregated content tag database 208 is described below in conjunction with FIG. 6. In an example embodiment, tags from multiple media content receivers 112 may mark approximately the same relative portion of the same media content item as a portion for which playback is to be modified. Based on those multiple tags, the content tag aggregation module 206 may generate a single aggregated tag designating a starting location and an ending location within the media content item of that portion, such as when a different media content receiver 112 subsequently presents the same media content item to a viewer. In another example embodiment, two separate aggregated content tags (e.g., a starting location tag and an ending location tag) may be generated for the portion of the media content item.

The aggregation of multiple content tags into a single aggregated tag (or pair of tags) may be performed in a number of ways. For example, the content tag aggregation module 206 may first organize the content tags received from the media content receivers 112 into separate groups that may identify the same general location within a media content item, such as a starting location and an ending location of a particular portion to be skipped within the item. Such organizing or identifying of groups may be performed using any of a number of methods, such as a nearest neighbor algorithm, which may be employed to group the content tags based on their location relative to each other.

In some example embodiments, each of the received content tags may include an indication of whether the tag corresponds with a starting or ending location of a portion for which playback is to be modified. For example, a first tag may correspond with a fast-forward command, indicating that the tag is associated with a starting location of a portion to be skipped, while a second tag may correspond with a play command, indicating that the second tag is associated with an ending location of the skipped portion. Thus, such indications of whether particular tags designate either starting or ending locations of the portions may facilitate the grouping of tags, as well as the identification of the actual portions of the media content item for which playback is to be modified, along with an indication of the modification to be performed (e.g., skipping the portion, muting the portion, replaying the portion, presenting an alert while playing the portion, and the like).

In yet other example embodiments in which the content tags do not provide an indication as to whether the associated location is a starting location or ending location of a portion for which playback is to be modified, such associations may be inferred based on how close a first group of content tags is located within the media content item to a second group. For example, two groups that are relatively close to each other may be considered as designating the starting and ending locations of the same portion. In some examples, the identifying of the starting and ending locations of the same portion for which playback is to be modified may be performed after the groups of content tags are aggregated.

Each identified group of content tags may then be aggregated into a single content tag by any of a number of methods. For example, each of the content tags within a group may be averaged in some way, such as by calculating a mean, median, or mode of the locations of the content tags within the group to generate the aggregated tag.

In another example embodiment, the tags within a group may be aggregated to an earliest tag or latest tag within the group based on whether the group of tags corresponds to a starting location or an ending location of the portion for which playback is to be modified. In an example embodiment in which the group of tags are associated with a fast-forward command (thus possibly indicating a starting location of a skipped portion), the earliest tag of that group may be identified as the aggregated tag for that group. Accordingly, if the group of tags are associated with a play command (thus possibly indicating an ending location of the skipped portion), the latest tag of the group may be identified as the aggregated tag for the group.

In some example embodiments, the earliest, latest, or average content tag in a group may be further modified based on some rule. For example, an earliest or average content tag for a starting location of a portion of the media content item may be adjusted earlier or later by some predetermined amount or percentage within the media content item, as may be a latest or average content tag for an ending location.

In some example embodiments, the various content tags may be compared to starting and ending locations of predetermined or previously known portions or extents of the media content item to identify which of the content tags are identified with the predetermined or previously known portions of the media content item. These previously known portions of the media may include, for example, known points in time at which advertisements begin and end in a television program, known sections of time during which a timeout or other stoppage in play occur during a sporting event, known points in time at which potentially objectionable or desirable portions of a movie occur, and so on. Identifying each of the particular content tags with one of the predetermined portions of the media content item may result in the grouping and aggregating of the content tags, as mentioned above.

A source of the media content item, in some example embodiments, may provide the information identifying the locations of previously known extents of the media content item to the media content playback control system 102, which may store that information in the known extents database 212 for use by the content tag aggregation module 206. In some example embodiments, the known extents database 212 may include additional information pertaining to one or more of the known extents of the media content item. This additional information may include, but is not limited to, genre or type information In some example embodiments, the content tag aggregation module 206 may ignore one or more groups of content tags based on a static or dynamic threshold number of content tags in a group. For example, if the number of content tags in a group is less than some predetermined threshold number, the content tag aggregation module 206 may not generate an aggregated tag that is representative of that group. In another example embodiment, if the number of content tags in a group is less than some threshold number based on the number of content tags in other groups (e.g., some percentage of an average number of content tags in a group), the content tag aggregation module 206 may not generate an aggregated tag for that group. Other methods of eliminating one or more content tag groups may be employed in other example embodiments, thus potentially resulting in those tags being ignored for the purpose of identifying portions of the media content item for modified playback. In another example embodiment, content tags for a particular group that indicate viewer approval of the associated portion of the media content item may be balanced against other content tags of that same group that indicate viewer disapproval of the portion, possibly resulting in the tags associated with that group being ignored.

In an example embodiment, the content tag aggregation module 206 may also generate additional information associated with the aggregated content tag based on additional information stored in either or both the content tag database 204 or the known extents database 212. In an example embodiment, the content tag aggregation module 206 may retrieve genre, rating, and other information relating to a known extent of a media content item from the known extents database 212 and store that information with an associated aggregated content tag in the aggregated content tag database 208. In another example embodiment, the content tag aggregation module 206 may also aggregate additional information (e.g., rating information, genre information, and so on) supplied with the content tags in the content tag database 204 and store the aggregated additional information with an associated aggregated content tag in the aggregated content tag database 208. Aggregation of the additional information may involve an average (e.g., a mean, median, or mode of the information) of the additional information among the content tags of the content tag database 204, or via other means.

After the content tag aggregation module 206 generates the aggregated content tags for one or more media content items, the aggregated content tag transmission module 210 may transmit the aggregated tags for one or more media content items via the network 106 to one or more of the media content receivers 112. The aggregated content tag transmission module 210 may perform the transmission of the aggregated tags according to one or more different methods. In one example, the aggregated content tag transmission module 210 may transmit the aggregated tags for one or more media content items separately from the media content items themselves. The particular tags to be transmitted to a particular media content receiver 112 may be based on the particular media content items that have been recorded using the corresponding media content recorder 116 or that otherwise have been marked or noted for viewing in the future. Further, in some example embodiments, the aggregated tags for a particular media content item may be transmitted at a time when other activities within the media content receiver 112 are unlikely to occur, such as during the late evening or early morning hours. In instances in which the media content receiver 112 begins presentation of a previously recorded media content item, or begins streaming a previously broadcast media content item from a content source 108, 110, the aggregated content tag transmission module 210 may be informed of that fact (e.g., via a message transmitted over the network 106 to the media content playback control system 102 from the media content receiver 112 that is presenting the content to the viewer) and transmit the aggregated content tags for that media content item immediately.

In other example embodiments in which a set of aggregate content tags have been generated prior to the recording, streaming, or transmission of the associated media content item to the media content receiver 112, the aggregated content tag transmission module 210 may integrate the aggregated content tags with their associated media content item prior to such recording, streaming, or other transmission. For example, as is discussed below in conjunction with FIG. 4, the aggregated content tag transmission module 210 may transmit the aggregated tags for the media content item to one or more of the content sources 108, 110, which may, in turn, integrate the information with the media content item prior to transmission of the media content item to the one or more media content receivers 112 that will be presenting the media content item to a viewer. In one example, the aggregated content tags may be transmitted in a data structure that is separate from the media content item, but transmitted along with that item. In another example embodiment, the aggregated content tags may be incorporated more intimately with the media content item such that each aggregated tag appears in conjunction with its associated location within the media content item, such as during a vertical blanking interval (VBI) between frames of a video media content item.

The content popularity data generation module 214 may access any or all of the content tag database 204, the aggregated content tag database 208, and the known extents database 212 to generate content popularity data, and to store the generated content popularity data in the content popularity database 216. In an example embodiment, the content popularity data generation module 214 may determine, based on the number of content tags associated with each portion of content for which playback is to be modified within a media content item, a relative popularity (or lack thereof) of each portion. This information may be made accessible, such as for a fee, to one or more media stakeholders, such as content providers or distributors responsible for the media content item or the portions therein. For example, retailers or manufacturers responsible for a particular advertisement may benefit from the content popularity data, which may indicate whether that advertisement is being well received by viewers. In another example, a movie studio may access the content popularity data to determine whether any particular portions of a movie are not being viewed favorably. An example of data stored in the content popularity database 216 is discussed below in conjunction with FIG. 7.

Figure 3:
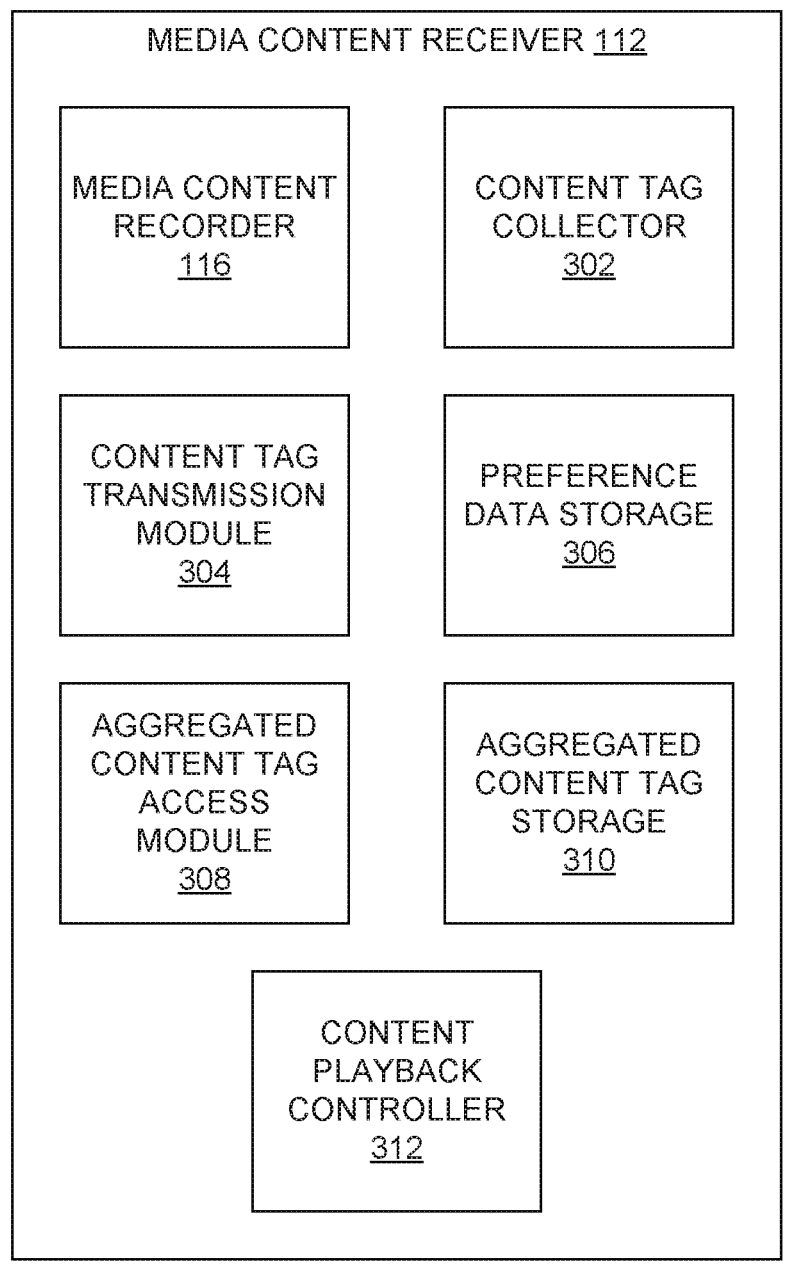
FIG. 3 is a block diagram of the example media content receiver of FIG. 1.

FIG. 3 is a block diagram of one of the example media content receivers 112 of FIG. 1. In the example embodiment of FIG. 3, the media content receiver 112 may include one or more of the media content recorder 116, a content tag collector 302, a content tag transmission module 304, preference data storage 306, an aggregated content tag access module 308, aggregated content tag storage 310, or a content playback controller 312. In other example embodiments, one or more of the modules 116 and 302-312 of FIG. 2 may be omitted or combined with other modules, and one or more modules not explicitly discussed herein may be included within the media content playback control system 102. In some example embodiments, one or more of the modules 116 and 302-312 may include hardwired modules, one or more processors, and associated memory that includes instructions executable by the one or more processors, or some combination thereof.

The media content recorder 116 may be configured to record, and facilitate playback of, media content items for subsequent viewing by a viewer. In an example embodiment, the media content recorder 116 may include a non-volatile storage medium, such as a hard disk drive, optical disk drive, flash memory, or the like, for storing the recorded media content items. Viewer input, such as by way of a remote control device for the media content receiver 112, for example, may control the playback of a media content item (e.g., initiating playback of a media content item, manually fast-forwarding through portions of the media content item, rewinding to review a portion of the media content item that was previously played, and so on). As is described more fully below, the content playback controller 312 may also control the operation of the media content recorder 116 based on aggregated content tags for the media content item that have been received at the media content receiver 112.

The content tag collector 302 may be configured to receive and collect content tags generated in response to viewer input, such as via a remote control device, during viewing of media content items. In some example embodiments, the input from the viewer for generating the content tags may be either explicit markings of locations within the media content item that delineate the portions of the media content item for which playback is to be modified, or may be more typical user interaction with the media content receiver 112 from which the content tags are inferred.

In example embodiments in which explicit markings are employed, a viewer may press a button on a remote control device that marks the beginning of a portion of the media content item currently being viewed. The viewer may then press a second button on the remote control device that marks the end of that portion of the media content item, thus indicating a favorable or unfavorable impression by the user of the designated portion. In some example embodiments, the first button and the second button may be the same button, thus allowing the viewer to mark the beginning and ending locations of portions by just pressing the same button. In those example embodiments, the media content receiver 112 may cause an indication to be displayed on the media content presentation device 114 to inform the viewer that the currently playing portion of the media content item is being marked for modified playback. Such an indication may remind the viewer that the button of the remote control device will need to be pressed again to designate the end of the portion the viewer is marking. The viewer, by way of the explicit markings, may mark a portion of a media content item for skipping, muting, replay, or other modified playback on another media content receiver 112 while recorded or live media content is being presented. In some example embodiments, different buttons on a remote control device may be provided for marking portions that are favorable or unfavorable in the eyes of the viewer.

In example embodiments in which the content tags are inferred based on viewer interaction with the media content recorder 116, the viewer may employ, for example, a fast-forward mode to skip over a portion of a pre-recorded media content item, followed by reentering normal play mode after the portion has been fast-forwarded through. In response to these actions, the content tag collector 302 may interpret a first location in the media content item at which the fast-forward operation started as the starting location of the portion to be skipped, and may interpret a second location at which the normal play mode was reentered as the ending location of the portion. In other example embodiments, the content tag collector 302 may interpret a first location at which a rewind operation is started as an ending location of a portion to be highlighted or promoted, and may interpret a second location at which the normal play mode is reentered as the starting location of that portion.

While this inferred mode of tag generation is employable primarily with non-live (recorded) media content items being viewed, alternatives of this mode may be employed for media content items that are being viewed live. For example, in example embodiments in which a viewer may use the media content recorder 116 to pause or replay media content that is being received live, the viewer may pause playing of the media content item at the beginning of a portion to be skipped, and then fast-forward after a period of time to resume live playing of the media content item at the end of the portion being skipped. In this example, the content tag collector 302 may interpret the location at which the media content item was paused as the starting location of the portion to be skipped, and may interpret the transition from fast-forward to normal play mode as the ending location of the portion. Other possibilities regarding interpretation of trick modes initiated by the user as content tags are also possible.

The content tag collector 302 may also be configured to request additional information from the viewer regarding a reason as to why a portion of a media content item was marked for modified playback. The content tag collector 302, in an example embodiment, may present a question or other information on the media content presentation device 114 to the viewer, to which the viewer may respond by way of a remote control device. Such questions or other information may include a request to provide a reason for marking the portion, a ranking of the portion, and the like. The content tag collector 302 may then store the viewer response in conjunction with the associated content tags The content tag transmission module 304 may be configured to transmit the content tags generated and collected by the content tag collector 302 for one or more media content items over the network 106 to the media content playback control system 102. Depending on the example embodiment, the content tag transmission module 304 may transmit any collected content tags periodically (e.g., once a day, such as during the late night or early morning hours), after a viewing of a media content item is complete, upon request from the media content playback control system 102, or at other times or intervals. The content tag transmission module 304 may also transmit additional information associated with the content tags, such as responses or information from the viewer regarding reasons for marking, ratings of marked portions, and the like, as described above.

The preference data storage 306 may be configured to store viewer preferences regarding which portions of a media content item are to be skipped, muted, replayed, and so on based on aggregated content tags accessed at the media content receiver 112. In an example embodiment, the preference data storage 306 may store particular genres or types of portions that a viewer desires to be skipped, genres or types of portions that a viewer desires to be muted, genres or types of portions that a viewer desires to be replayed, genres or types of portions during which a viewer desires an alert (e.g., a visual icon) to be presented, types of portions which, when present, are to be played to the exclusion of all other portions, and the like. Such portion genres or types may include, but are not limited to, advertisements, sports event timeouts, violent scenes, sports highlights, exciting action scenes, and the like. The preference data storage 306 may also store information regarding portion ratings, as may be provided with the aggregated content tags based on feedback provided by other viewers, indicating how low a rating for a portion of the media content item may be before the portion is skipped during playback at the media content receiver 112, or how high a rating may be before the portion is replayed or otherwise highlighted at the media content receiver 112. In an example embodiment, a viewer may provide the preference information by way of the remote control device in response to questions displayed via the media content presentation device 114, by way of a smart phone or computer, or via other means.

The aggregated content tag access module 308 may be configured to receive or otherwise access aggregated content tags for one or more media content items to be viewed via the media content recorder 116. The aggregated content tag access module 308 may then store the accessed aggregated content tags in the aggregated content tag storage 310. In an example embodiment, the aggregated content tag access module 308 may receive the aggregated content tags, possibly including additional information related to the tags, either in conjunction with, or separately from, the media content items containing the portions for which playback is to be modified using the aggregated content tags. As indicated in the example embodiment of FIG. 4, discussed more fully below, the aggregated content tag access module 308 may receive the aggregated content tags from the media content playback control system 102 or a content source 108, 110 via the network 106.

Figure 4:
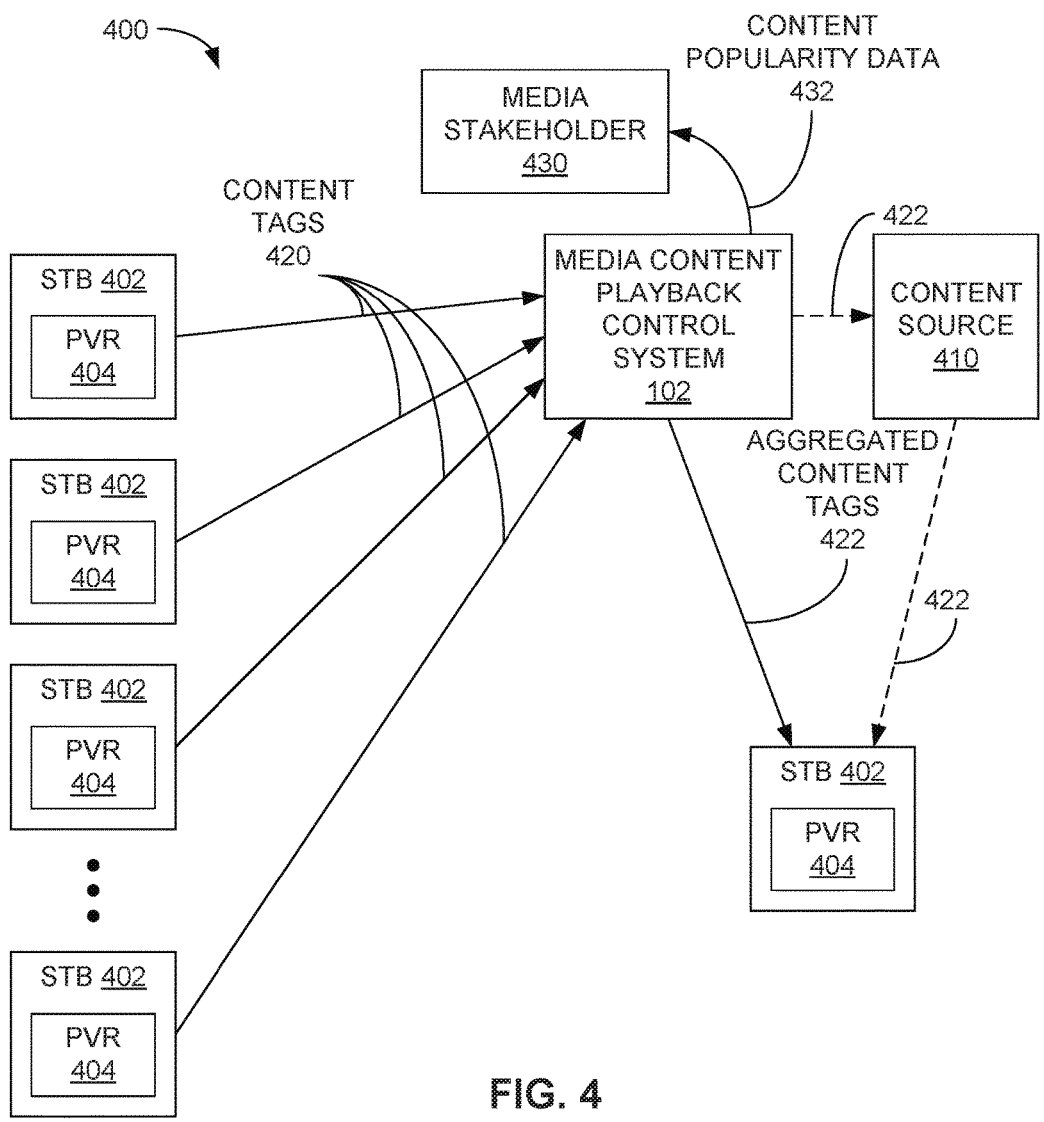
FIG. 4 is a data flow diagram of content tags and aggregated content tags transferred in an example media content system.

The content playback controller 312 may be configured to access the aggregated content tag storage 310, as well as the preference data storage 306, if present, and to control the playback of a media content item via the media content recorder 116 based on the retrieved tags and preference data. In an example embodiment, the content playback controller 312 may skip over portions of the media content item being played back for the viewer that are designated by the aggregated content tags. In an example embodiment, the content playback controller 312 may compare additional information stored with the aggregated content tags to viewer preference data stored in the preference data storage 306 to determine if the skipping of the portion associated with the aggregated content tags is to be performed. For example, if an aggregated content tag indicates that a portion to be skipped is an advertisement, but the preference data for the viewer indicates that advertisements are to be played, the content tags associated with the current advertisement portion are ignored, thus allowing the advertisement to be presented to the viewer. Other information that may condition whether an aggregated content tag is implemented or ignored may include, for example, portion genre or type information (e.g., skip advertisements, but allow violent movie scenes), rating information (e.g., skip portions that are rated at or below a five on a scale of one to ten), and so forth. In some example embodiments, the content playback controller 312 may compare additional information stored with the aggregated content tags to viewer preference data stored in the preference data storage 306 to determine if muting, replaying, or other modified playback of the portion associated with the aggregated content tags is to be performed. FIG. 4 is a data flow diagram of content tags 420 and aggregated content tags 422 transferred in the example media content system 100 of FIG. 1. In the example of FIG. 4, multiple set-top boxes 402 (serving as media content receivers 112), at least some of which may include personal video recorders 404, each generate content tags 420, such as those explicitly entered or implicitly inferred via viewer actions, and transmit the tags 420 to the media content playback control system 102. After generating aggregated content tags 422 based on the received content tags 420, the media content playback control system 102 may then transmit the aggregated content tags 422 to a separate set-top box 402 and associated personal video recorder 404 for one or more media content items to modify the playback of an associated media content item. In an example embodiment, the media content playback control system 102 may directly transmit the aggregated content tags 422 to the separate set-top box 402 in response to a request from the set-top box 402 for that information. The request may be based on input from a viewer to play back the media content item using the corresponding personal video recorder 404.

In another example embodiment, the media content playback control system 102 may transmit the aggregated content tags 422 for a particular media content item to a content source 410. In response to receiving the aggregated content tags 422, the content source 410 may integrate the aggregated content tags 422 with its corresponding media content item, such as in a separate file or integrated with the media content item at locations associated with the locations designated by the aggregated content tags 422 (e.g., at the vertical blanking intervals mentioned above). Thereafter, the content source 410 may transmit the media content item (e.g., downloaded as a file, played as a stream, and so on), integrated with its aggregated content tags 422, to the separate set-top box 402 that will play back the media content item for presentation to the viewer.

The media content playback control system 102 may also be configured to transmit content popularity data 432 (e.g., stored at the content popularity database 216 described above) to a media stakeholder 430, such as a producer or distributor of media content items for which aggregated content tags 422 are generated. In another example embodiment, the media content playback control system 102 may transmit the content popularity data 432 to the content source 410, which might be viewed as a media stakeholder 430.

FIGS. 5-7 depict example embodiments of the databases described above. Each of the databases of FIGS. 5-7 may be implemented by a relational database management system (RDBMS), although other types of databases, as well as more generalized data structures not strictly implemented as databases, may be utilized in other embodiments.

FIG. 5 is graphical depiction of an example of the content tag database 204 of the media content playback control system 102 of FIG. 2. In this example embodiment, the content tag database 204 may include multiple entries, with each entry representing a content tag 420 received from a media content receiver 112. In the example of FIG. 5, a content tag entry may include a device identifier 502, a program/channel identifier 504, a tag indication 506, and a location/timestamp 508. The device identifier 502 may be a value indicating the identity of the media content receiver 112 providing the content tag 420. The program/channel identifier 504 may provide a program name, broadcast channel number, source uniform resource locator (URL), broadcast time, and/or any other identifying information that may be used to identify the media content item containing the portion designated by the content tag 420. The tag indication 506 may provide some indication of whether the content tag 420 corresponds to a starting location or an ending location of the portion, an indication of the type of modification to be applied to the portion (e.g., skipped, muted, replayed, highlighted, and so on), an indication as to whether the portion is viewed in a positive or negative light by other viewers, and so forth. This indication may be explicit (e.g., an explicit starting or ending location mark by the viewer), or may refer instead to a particular viewer input from which the starting or ending location may be inferred (e.g., a location at which a fast-forward, pause, or resume playback command was received from the viewer). The location/timestamp 508 may be a time offset or other location of the content tag 420 within the media content item containing the portion. In some example embodiments, a single content tag 420 may include two tag indications 506 and/or two location/timestamps 508 that may designate both the starting and ending locations of a portion for which playback is to be modified.

In some example embodiments, one or more entries of the content tag database 204 may include other information provided by the viewer, such as a personal rating of the portion corresponding to the tag, a perceived genre or type of the portion, and the like, as described above.

FIG. 6 is graphical depiction of an example of the aggregated content tag database 208 of the media content playback control system 102 of FIG. 2. In this example embodiment, the aggregated content tag database 208 may include multiple entries, with each entry representing an aggregated content tag 422 generated by the content tag aggregation module 206 for a particular media content item. In the example of FIG. 6, an aggregated content tag entry may include a program/channel identifier 602, a starting location/timestamp 604, an ending location/timestamp 606, playback control 608, and genre/rating information 610. As with the content tag database 204, the program/channel identifier 602 may provide a program name, broadcast channel number, source URL, broadcast time, and/or any other identifying information that may be used to identify the media content item containing the portion designated by the aggregated content tag 422. The starting location/timestamp 604 may be a time offset or other indication of the starting location for the portion to be skipped within the media content item, while the ending location/timestamp 606 may be a time offset or other indication of the ending location for the portion for which playback is to be modified. In other example embodiments, the starting location/timestamp 604 and the ending location/timestamp 606 may be presented in separate entries of the aggregated content tag database 208. The playback control 608 may be an indication of the type of playback modification to be performed on the designated portion (e.g., skipped, muted, replayed, highlighted with an alert, and so on). In other example embodiments, the playback control 608 may be a more general positive or negative indicator regarding the merit of the portion, as indicated by other viewers.

In some example embodiments, one or more entries of the aggregated content tag database 208 may include other information, such as genre/rating information 610, which may be provided by the viewers in conjunction with the content tags 420 received via the content tag access module 202, or from information stored in the known extents database 212. Examples of the genre/rating information 610 may include, but is not limited to, an aggregate rating of the corresponding portion, a genre or type of the portion, and so on.

FIG. 7 is a graphical depiction of an example of the content popularity database 216 of the media content playback control system 102 of FIG. 2. In this example embodiment, the content popularity database 216 may include multiple entries, with each entry representing content popularity data for a particular portion of a media content item. In the example of FIG. 7, a content popularity entry may include a program/channel identifier 702, a content portion identifier 704, a content portion location/timestamp 706, and rating information 708. The program/channel identifier 702 may provide a program name, broadcast channel number, source URL, broadcast time, and/or any other identifying information that may be used to identify the media content item associated with the content popularity data 432 of the portion corresponding to this entry. The content portion identifier 704 may provide a name or other identifier (e.g., advertisement name) of the particular portion of the media content item. The content portion location/timestamp 706 may be a time offset or other indication of the starting location (or some other location therein) for the portion of the media content item. The rating information 708 may be information that is in a numerical format or in some other format that indicates the relative or absolute popularity of the portion, as indicated by the viewers that provided the content tags 420 received at the media content playback control system 102. Other information may be included in the entries of the content popularity database 212 in other example embodiments.

FIGS. 8-11 provide methods of operating various devices or systems of the media content system 100 of FIG. 1. However, other devices or systems not specifically disclosed herein may also perform these methods and variations thereof. Also, while the operations of the methods of FIGS. 8-11 are presented in a particular order, other orders of execution are also possible, including simultaneous, concurrent, or overlapping execution of two or more operations.

Figure 8:
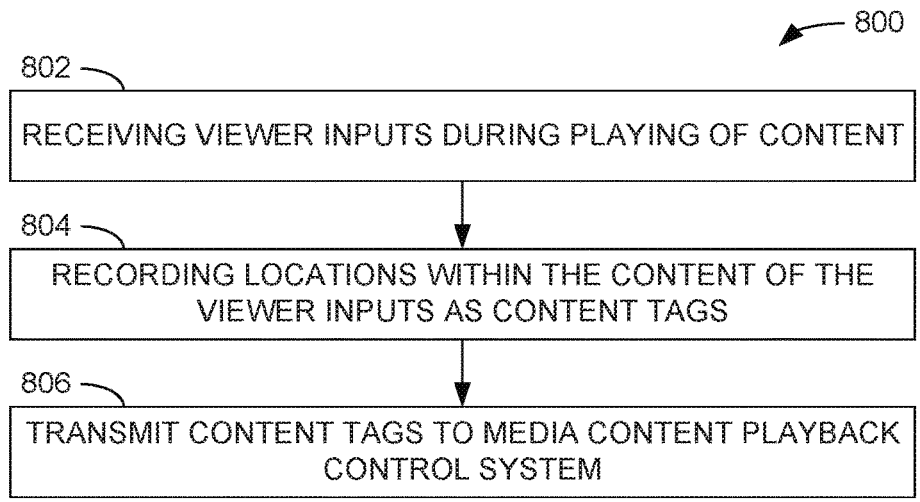
FIG. 8 is a flow diagram of an example method for providing content tags at a media content receiver.

FIG. 8 is a flow diagram of an example method 800 for providing content tags 420 at a media content receiver, such as the media content receiver 112 of FIGS. 1 and 3. In the method 800, viewer inputs are received during the playing of a media content item (operation 802). The viewer inputs may be interpreted as explicit or implicit markings of the starting and ending locations of portions of the media content item, as described above. In response to the viewer inputs, corresponding locations within the media content item are recorded as content tags 420 to identify the portions of the media content item (operation 804). The content tags 420 may then be transmitted to the media content playback control system 102 (operation 806), which may then aggregate the content tags 420 from multiple such media content receivers 112 and distribute the aggregated content tags 422 to allow other viewers to automatically modify the playback of portions of the same media content item, as discussed above.

Figure 9:
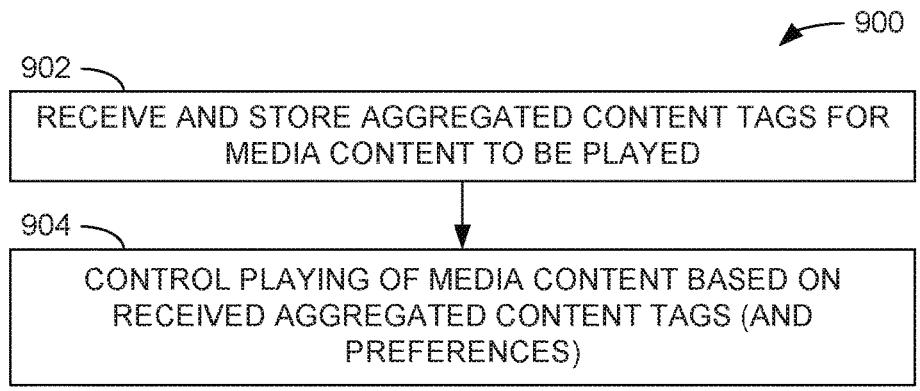
FIG. 9 is a flow diagram of an example method for employing aggregated content tags at a media content receiver.

FIG. 9 is a flow diagram of an example method 900 for employing aggregated content tags 422 at the media content receiver 112. In the method 900, the media content receiver 112 may receive, and possibly store, aggregated content tags 422 for a media content item to be played at the media content receiver 112 (operation 902), such as by way of a media content recorder 114 associated therewith. In some example embodiments discussed above, the aggregated content tags 422 may be received separately from their corresponding media content item (e.g., from the media content playback control system 102), or integrated with the media content item (e.g., from the content source 108, 110, 410). The media content receiver 112 may then automatically control playing of the media content item for presentation to the viewer based on the received aggregated content tags 422 (operation 904), such as by skipping, muting, replaying, or otherwise modifying the playback of portions of the media content item based on the tags. In some example embodiments, the control of the playing of the media content item may also be based on additional information (e.g., rating information, genre information, and so on) associated with the aggregated content tags 422, as well as on preference information associated with the viewer, as explained above.

Figure 10:
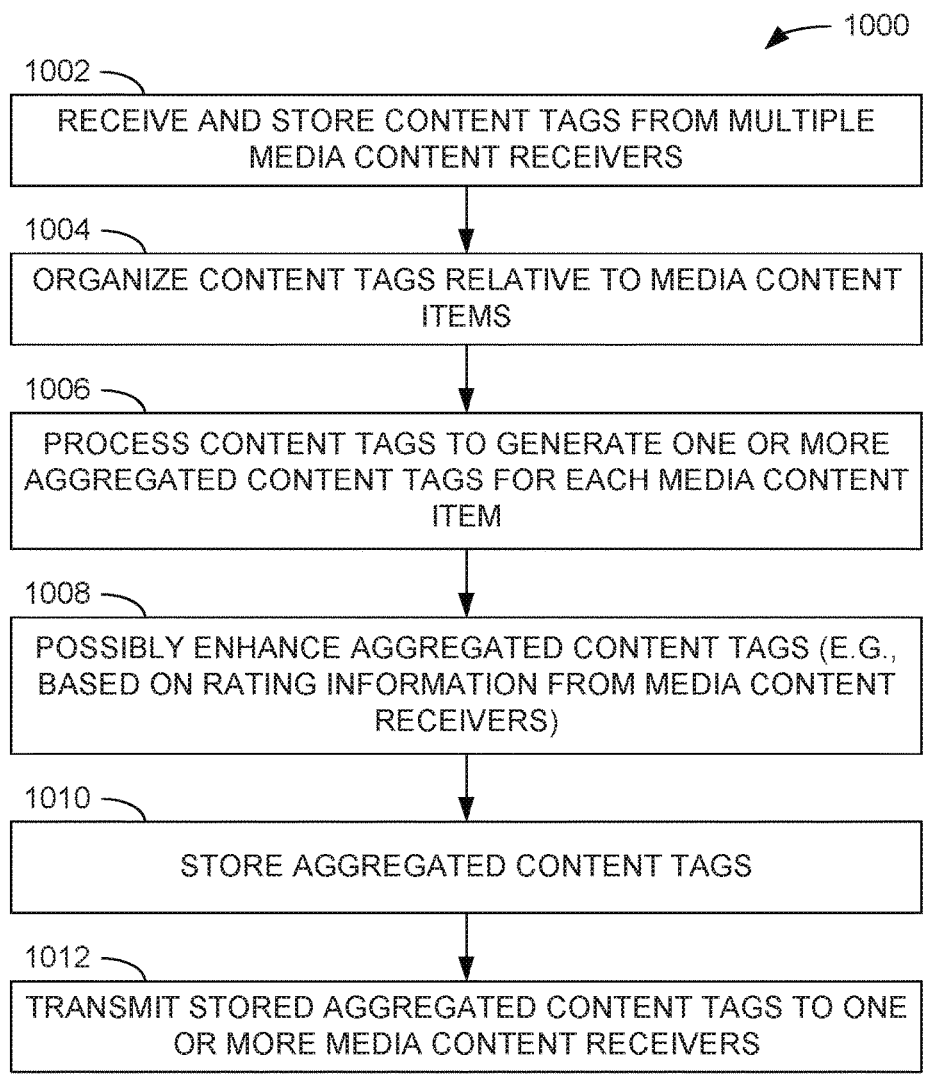
FIG. 10 is a flow diagram of an example method for generating and distributing aggregated content tags based on received content tags at a media content playback control system.

FIG. 10 is a flow diagram of an example method 1000 for generating and distributing aggregated content tags 422 based on received content tags 420 at the media content playback control system 102. In the method 1000, the media content playback control system 102 may receive content tags 420 from multiple media content receivers 112 and store the tags (operation 1002). The content tags 420 may be organized to relate each tag to its corresponding media content item (operation 1004), such as by way of channel/program identifiers and associated timestamps or locations noted in the content tags 420. The content tags 420 may be processed to generate one or more aggregated content tags 422 (operation 1006). The aggregated content tags 422 may be enhanced to include additional information (operation 1008), such as rating information from the media content receivers 112. The aggregated content tags 422 may be stored locally (operation 1010) and transmitted to one or more media content receivers 112 (operation 1012), at which the aggregated content tags 422 may be employed to skip, mute, replay, highlight, or otherwise modify the playback of the one or more portions of the media content items corresponding to the tags.

Figure 11:
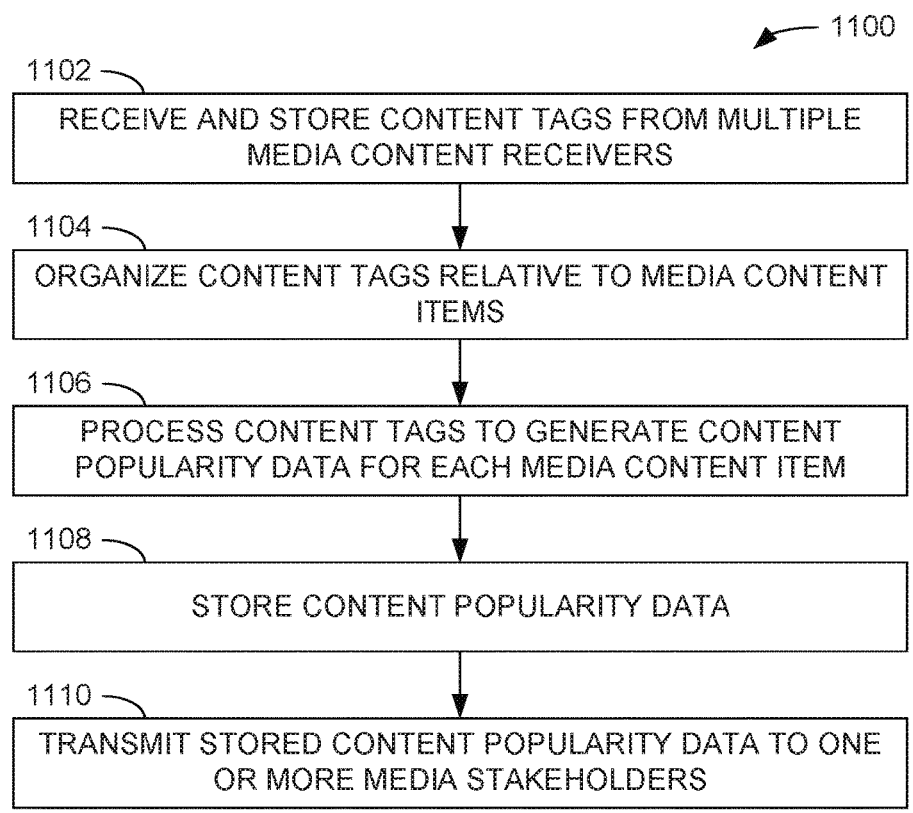
FIG. 11 is a flow diagram of an example method for generating and distributing content popularity data based on received content tags at a media content playback control system.

FIG. 11 is a flow diagram of an example method 1100 for generating and distributing content popularity data 432 based on received content tags 420 at a media content playback control system 102. In the method 1100, the media content playback control system 102 may receive the content tags 420 from the multiple media content receivers 112 and store the tags (operation 1102). The content tags 420 may be organized to relate each tag to its corresponding media content item (operation 1104) and processed to generate content popularity data 432 for each media content item (operation 1106). In some example embodiments, the generated content popularity data 432 may be based on the number of content tags 420 received for each portion of a media content item. The content popularity data 432 may be stored (operation 1108) and subsequently transmitted to one or more media stakeholders 430, such as media content creators, providers, distributors, and the like.

Figure 12:
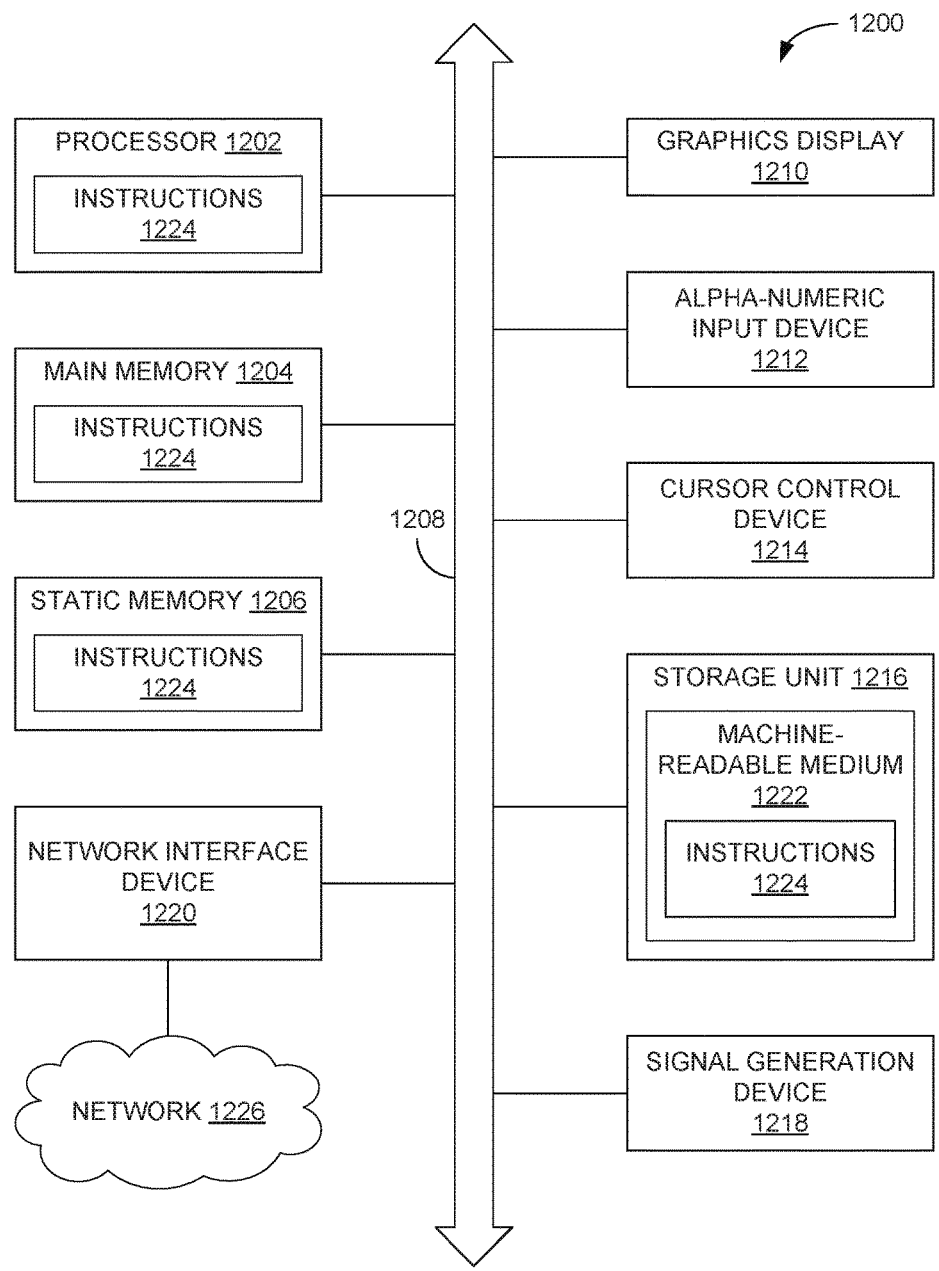
FIG. 12 is a simplified block diagram of a machine in an example form of a computing system within which a set of instructions for causing the machine to perform any one or more of the methodologies discussed herein may be executed.

FIG. 12 is a block diagram illustrating components of a machine 1200, according to some example embodiments, able to read instructions 1224 from a machine-readable medium 1222 (e.g., a non-transitory machine-readable medium, a machine-readable storage medium, or a computer-readable storage medium) and perform any one or more of the methodologies discussed herein, in whole or in part. Specifically, FIG. 12 depicts the machine 1200 in the example form of a computer device (e.g., a computer) within which the instructions 1224 (e.g., software, firmware, a program, an application, an applet, an app, or other executable code) for causing the machine 1200 to perform any one or more of the methodologies discussed herein, in whole or in part.

For example, the instructions 1224 may cause the machine 1200 to execute the flow diagrams of FIGS. 8 through 11. The instructions 1224 can transform the general, non-programmed machine 1200 into a particular machine (e.g., specially configured machine) programmed to carry out the described and illustrated functions in the manner described. Also in example embodiments, the machine 1200 may operate as one or more of the media content receiver 112 of FIGS. 1 and 3, the media content playback control system 102 of FIGS. 1 and 2, or any other computing system or device described herein.

In example embodiments, the machine 1200 operates as a standalone device or may be connected (e.g., networked) to other machines. The machine 1200 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 1200 capable of executing the instructions 1224, sequentially or otherwise, that specify actions to be taken by that machine 1200. Further, while only a single machine 1200 is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 1204, and a static memory 1206, which are configured to communicate with each other via a bus 1208. The processor 1202 may contain microcircuits that are configurable, temporarily or permanently, by some or all of the instructions 1224 such that the processor 1202 is configurable to perform any one or more of the methodologies described herein, in whole or in part. For example, a set of one or more microcircuits of the processor 1202 may be configurable to execute one or more modules (e.g., software modules) described herein.

The machine 1200 may further include a graphics display 1210 (e.g., a plasma display panel (PDP), a light-emitting diode (LED) display, a liquid crystal display (LCD), a projector, a cathode ray tube (CRT), or any other display capable of displaying graphics or video). The machine 1200 may also include an alphanumeric input device 1212 (e.g., a keyboard or keypad), a cursor control device 1214 (e.g., a mouse, a touchpad, a trackball, a joystick, a motion sensor, an eye tracking device, or other pointing instrument), a storage unit 1216, a signal generation device 1218 (e.g., a sound card, an amplifier, a speaker, a headphone jack, or any suitable combination thereof), and a network interface device 1220.

The storage unit 1216 includes the machine-readable medium 1222. (e.g., a tangible machine-readable storage medium) on which is stored the instructions 1224 embodying any one or more of the methodologies or functions described herein. The instructions 1224 may also reside, completely or at least partially, within the main memory 1204, within the processor 1202 (e.g., within a cache memory of the processor 1202), or both, before or during execution thereof by the machine 1200. Accordingly, the main memory 1204 and the processor 1202 may be considered machine-readable media 1222 (e.g., tangible and non-transitory machine-readable media).

In some example embodiments, the machine 1200 may be a portable or mobile computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 1222 able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions 1224. The term "machine-readable medium" shall also be taken to include any medium, or combination of multiple media, that is capable of storing instructions 1224 for execution by a machine (e.g., machine 1200), such that the instructions 1224, when executed by one or more processors of the machine 1200 (e.g., processor 1202), cause the machine 1200 to perform any one or more of the methodologies described herein. The term "machine-readable medium" shall accordingly be taken to include, but not be limited to, one or more data repositories in the form of a solid-state memory, an optical medium, a magnetic medium, or any suitable combination thereof.

Furthermore, the machine-readable medium 1222 is non-transitory in that it does not embody a propagating or transitory signal. However, labeling the machine-readable medium 1222 as "non-transitory" should not be construed to mean that the medium is incapable of movement; the medium should be considered as being transportable from one physical location to another in some example embodiments. Additionally, since the machine-readable medium 1222 is tangible, the medium may be considered a machine-readable device.

The instructions 1224 may further be transmitted or received over a communications network 1226 using a transmission medium via the network interface device 1220 and utilizing any one of a number of well-known transfer protocols (e.g., Hypertext Transfer Protocol (HTTP)). Examples of communication networks 1226 include a local area network (LAN), a wide area network (WAN), the Internet, mobile telephone networks, plain old telephone service (POTS) networks, and wireless data networks (e.g., Wi-Fi®, LTE®, and WiMAX™ networks). The term "transmission medium" shall be taken to include any intangible medium that is capable of storing, encoding, or carrying instructions 1224 for execution by the machine 1200, and includes digital or analog communications signals or other intangible medium to facilitate communication of such software.

In an example embodiment, a method comprises receiving, from a plurality of media content devices over a communication network, a plurality of content tags, each of the plurality of content tags designating a location within a media content item; processing, using one or more hardware processors, the content tags to generate aggregated content tags for the media content item, the aggregated content tags designating one or more portions of the media content item for modified playback; and transmitting, over the communication network to a first media content device separate from the plurality of media content devices, the aggregated content tags for the media content item.

In another example embodiment, including all previous example embodiments, each of the plurality of content tags further comprises an indication as to whether the location within the media content item comprises a starting location or an ending location of a portion of the media content item to be skipped during playback of the media content item.

In another example embodiment, including all previous example embodiments, the processing of the content tags comprises identifying a first group of the plurality of content tags as designating a starting location of a first portion of the media content item for modified playback; aggregating the first group of the plurality of content tags to a first aggregated content tag designating the starting location of the first portion of the media content item for modified playback; identifying a second group of the plurality of content tags as designating an ending location of the first portion of the media content item for modified playback; and aggregating the second group of the plurality of content tags to a second aggregated content tag designating the ending location of the first portion of the media content item for modified playback.

In another example embodiment, including all previous example embodiments, the identifying of the first group of the plurality of content tags and the identifying of the second group of the plurality of tags are based on a proximity of the designated location of each of the plurality of content tags to the designated locations of others of the plurality of content tags.

In another example embodiment, including all previous example embodiments, the aggregating of the first group of the plurality of content tags to the first aggregated content tag comprises calculating a first average of the designated locations of the first group of the plurality of content tags, the starting location of the first portion of the media content item comprising the first average; and the aggregating of the second group of the plurality of content tags to the second aggregated content tag comprises calculating a second average of the designated locations of the second group of the plurality of content tags, the ending location of the first portion of the media content item comprising the second average.

In another example embodiment, including all previous example embodiments, the calculating of the first average comprises calculating one of a mean, median, or mode of the designated locations of the first group of the plurality of content tags; and the calculating of the second average comprises calculating one of a mean, median, or mode of the designated locations of the second group of the plurality of content tags.

In another example embodiment, including all previous example embodiments, the method further comprises accessing a plurality of known segment extents of the media content item, each of the plurality of known segment extents comprising a starting location and an ending location within the media content item; wherein the identifying of the first group of the plurality of content tags and the identifying of the second group of the plurality of content tags comprises comparing the plurality of content tags to the starting location and the ending location of at least some of the plurality of known extents of the media content item; wherein the aggregating of the first group of the plurality of content tags to the first aggregated content tag comprises setting the first aggregated content tag to designate the starting location of one of the plurality of known extents as the starting location of the first portion of the media content item; and wherein the aggregating of the second group of the plurality of content tags to the second aggregated content tag comprises setting the second aggregated content tag to designate the ending location of the one of the plurality of known extents as the ending location of the first portion of the media content item.

In another example embodiment, including all previous example embodiments, the method further comprises comparing a number of content tags in the first group of the plurality of content tags to a first threshold value, the aggregating of the first group of the plurality of content tags to the first aggregated content tag based on the number of content tags in the first group exceeding the first threshold value; and comparing a number of content tags in the second group of the plurality of content tags to a second threshold value, the aggregating of the second group of the plurality of content tags to the second aggregated content tag based on the number of content tags in the second group exceeding the second threshold value.

In another example embodiment, including all previous example embodiments, the aggregating of the first group of the plurality of content tags to a first aggregated content tag comprises setting the first aggregated content tag to designate the location of an earliest content tag of the first group as the starting location of the first portion of the media content item; and the aggregating of the second group of the plurality of content tags to a second aggregated content tag comprises setting the second aggregated content tag to designate the location of a latest content tag of the second group as the ending location of the first portion of the media content item.

In another example embodiment, including all previous example embodiments, the transmitting of the aggregated content tags occurs at a scheduled point in time.

In another example embodiment, including all previous example embodiments, the transmitting of the aggregated content tags occurs in response to a request from the first media content device to receive the media content item.

In another example embodiment, including all previous example embodiments, the transmitting of the aggregated content tags comprises transmitting the aggregated content tags within the media content item to the first media content device.

In another example embodiment, including all previous example embodiments, the method further comprises processing at least one of the content tags and the aggregated content tags to generate popularity data regarding the one or more portions of the media content item; and transmitting, over the communication network to a source of the media content item, the popularity data.

In another example embodiment, including all previous example embodiments, the method further comprises generating rating data for the one or more portions of the media content item designated for modified, the rating data based on the plurality of content tags; and transmitting, over the communication network to the first media content device, the rating information.

In another example embodiment, including all previous example embodiments, the method further comprises accessing a plurality of known segment extents of the media content item, each of the plurality of known segment extents comprising a starting location and an ending location within the media content item; accessing genre information for the plurality of known extents of the media content item; correlating the one or more portions of the media content item designated for modified playback with the genre information; and transmitting, over the communication network to the first media content device, the genre information corresponding to the aggregated content tags for the media content item.

In another example embodiment, including all previous example embodiments, the transmitting of the aggregated content tags cause the first media content device, after receiving the transmitted aggregated content tags, to skip the one or more portions of the media content item when the first media content device plays the media content item.

In another example embodiment, including all previous example embodiments, the transmitting of the aggregated content tags cause the first media content device, after receiving the transmitted aggregated content tags, to mute the one or more portions of the media content item when the first media content device plays the media content item.

In another example embodiment, including all previous example embodiments, the transmitting of the aggregated content tags cause the first media content device, after receiving the transmitted aggregated content tags, to replay the one or more portions of the media content item when the first media content device plays the media content item.

In another example embodiment, including all previous example embodiments, the transmitting of the aggregated content tags cause the first media content device, after receiving the transmitted aggregated content tags, to present an alert during the one or more portions of the media content item when the first media content device plays the media content item.

In an example embodiment, a method comprises presenting, at a media content device, a first media content item for viewing; receiving, at the media content device, multiple inputs from a viewer during the presenting of the first media content item; recording, using one or more hardware processors, a location within the first media content item for each of the multiple inputs; and transmitting, from the media content device over a communication network to a computing system, a plurality of content tags, each of the plurality of content tags designating the location within the first media content item for one of the multiple inputs.

In another example embodiment, including all previous example embodiments, the multiple inputs comprise tagging input provided by the viewer while the first media content item is played live to the viewer.

In another example embodiment, including all previous example embodiments, the multiple inputs comprise playback trick mode inputs provided by the viewer while the first media content item is played back to the viewer.

In another example embodiment, including all previous example embodiments, the method further comprises receiving, from the computing system via the communication network at the media content device, a second plurality of content tags designating one or more portions of a second media content item for modified playback; and controlling playback, at the media content device, of the second media content item based on the second plurality of content tags.

In another example embodiment, including all previous example embodiments, receiving, from the computing system via the communication network at the media content device, at least one of rating information and genre information corresponding to the one or more portions of the second media content item designated for modified playback by the second plurality of content tags; and accessing viewer preferences corresponding to at least one of ratings and genres of media content; wherein the controlling of the playback of the second media content item is further based on the viewer preferences and the at least one of the rating information and the genre information.

In another example embodiment, including all previous example embodiments, the media content device comprises a first media content device, the transmitting of the plurality of content tags to cause aggregation of the plurality of content tags with content tags from other media content devices to yield aggregated content tags, and to cause a second media content device separate from the first media content device and the other media content devices to skip portions of the first media content item designated by the aggregated content tags.

In another example embodiment, including all previous example embodiments, the media content device comprises a first media content device, the transmitting of the plurality of content tags to cause aggregation of the plurality of content tags with content tags from other media content devices to yield aggregated content tags, and to cause a second media content device separate from the first media content device and the other media content devices to mute portions of the first media content item designated by the aggregated content tags.

In another example embodiment, including all previous example embodiments, the media content device comprises a first media content device, the transmitting of the plurality of content tags to cause aggregation of the plurality of content tags with content tags from other media content devices to yield aggregated content tags, and to cause a second media content device separate from the first media content device and the other media content devices to replay portions of the first media content item designated by the aggregated content tags.

In another example embodiment, including all previous example embodiments, the media content device comprises a first media content device, the transmitting of the plurality of content tags to cause aggregation of the plurality of content tags with content tags from other media content devices to yield aggregated content tags, and to cause a second media content device separate from the first media content device and the other media content devices to present an alert during portions of the first media content item designated by the aggregated content tags.

In an example embodiment, a media system comprises one or more hardware processors; and memory including instructions that, when executed by the one or more hardware processors, cause the media system to perform operations comprising receiving, from a plurality of media content devices over a communication network, a plurality of content tags, each of the plurality of content tags designating a location within a media content item; processing the content tags to generate aggregated content tags for the media content item, the aggregated content tags designating one or more portions of the media content item for modified playback; and transmitting, over the communication network to a first media content device separate from the plurality of media content devices, the aggregated content tags for the media content item.

In an example embodiment, a media content device comprises one or more hardware processors; and memory including instructions that, when executed by the one or more hardware processors, cause the media system to perform operations comprising presenting a first media content item for viewing; receiving multiple inputs from a viewer during the presenting of the first media content item; recording a location within the first media content item for each of the multiple inputs; and transmitting, over a communication network to a computing system, a plurality of content tags, each of the plurality of content tags designating the location within the first media content item for one of the multiple inputs.

In an example embodiment, including all previous example embodiments, the media content device comprises one of a set-top box, a mobile communication device, a desktop computer, a tablet computer, a streaming device, a smart television, and a gaming system.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 1222 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 1202 or a group of processors 1202) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering example embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these example embodiments without departing from the broader scope of embodiments of the present disclosure. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single inventive concept if more than one is, in fact, disclosed.

The example embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:

receiving, from a plurality of devices over a communication network, a plurality of content tags, each content tag in the plurality of content tags comprising a location within a media content item and a tag indication that indicates whether the location of the content tag is of a first type or a second type;

identifying, using one or more hardware processors, based on the tag indication of each content tag in the plurality of content tags, a first group of content tags in the plurality of content tags, wherein the tag indication of each content tag in the first group of content tags indicates that the location for the content tag in the first group of content tags is of the first type;

generating, using the one or more hardware processors, a first aggregated content tag based on aggregating the first group of content tags, the first aggregated content tag comprising a first aggregated location within the media content item, the generating of the first aggregated content tag comprising: setting, based on a first location for a first content tag of the first group of content tags being an earliest location among all locations for content tags in the first group of content tags, the first aggregated location to the first location;

identifying, using the one or more hardware processors, based on the tag indication of each content tag in the plurality of content tags, a second group of content tags in the plurality of content tags, wherein the tag indication of each content tag of the second group of content tags indicates that the location for the content tag in the second group of content tags is of the second type;

generating, using the one or more hardware processors, a second aggregated content tag based on aggregating the second group of content tags, the second aggregated content tag designating a second aggregated location within the media content item, the generating of the second aggregated content tag comprising: setting, based on a second location for a second content tag of the second group of content tags being an latest location among all locations for content tags in the second group of content tags, the second aggregated location to the second location; and transmitting, over the communication network to a device not included in the plurality of devices, the first aggregated content tag and the second aggregated content tag.

2. The method of claim 1, wherein the first type of location is a starting location of a portion of the media content item and the second type of location is an ending location of a portion of the media content item.

3. The method of claim 1, wherein the first aggregated content tag and the second aggregated content tag identify a portion of the media content item to be skipped during playback of the media content item.

4. The method of claim 1, wherein:
the identifying of the first group of content tags is based on a proximity of the location for each content tag in the first group of content tags to the locations for other content tags of the plurality of content tags; and
the identifying of the second group of content tags is based on a proximity of the location for each content tag in the second group of content tags to the locations for other content tags of the plurality of content tags.

5. The method of claim 1, further comprising:
accessing a plurality of known segment extents of the media content item, each of the plurality of known segment extents comprising a starting location and an ending location within the media content item; and
wherein the identifying of the first group of content tags and the identifying of the second group of content tags comprises comparing the location for each content tag of the plurality of content tags to the starting location and the ending location of at least some of the plurality of known segment extents of the media content item.

6. The method of claim 1, further comprising:
comparing a number of content tags in the first group of content tags to a first threshold value, the generating of the first aggregated content tag being based on the number of content tags in the first group of content tags exceeding the first threshold value; and
comparing a number of content tags in the second group of content tags to a second threshold value, the generating of the second aggregated content tag being based on the number of content tags in the second group of content tags exceeding the second threshold value.

7. The method of claim 1, the transmitting of the aggregated content tags occurring at a scheduled point in time.

8. The method of claim 1, the transmitting of the aggregated content tags occurring in response to a request from the device to receive the media content item.

9. The method of claim 8, the transmitting of the aggregated content tags comprising transmitting the aggregated content tags within the media content item to the device.

10. The method of claim 1, further comprising:
processing at least one of the content tags and the aggregated content tags to generate popularity data regarding one or more portions of the media content item; and
transmitting, over the communication network to a source of the media content item, the popularity data.

11. The method of claim 1, further comprising:
generating rating data for one or more portions of the media content item, the rating data based on the plurality of content tags; and
transmitting, over the communication network to the device, the rating data.

12. The method of claim 1, further comprising:
accessing a plurality of known segment extents of the media content item, each of the plurality of known segment extents comprising a starting location and an ending location within the media content item;
accessing genre information for the plurality of known segment extents of the media content item;
correlating one or more portions of the media content item designated for modified playback with the genre information; and
transmitting, over the communication network to the device, the genre information corresponding to the aggregated content tags for the media content item.

13. The method of claim 1, the transmitting of the aggregated content tags to cause the device, after receiving the transmitted aggregated content tags, to skip one or more portions of the media content item when the device plays the media content item.

14. The method of claim 1, the transmitting of the aggregated content tags to cause the device, after receiving the transmitted aggregated content tags, to mute one or more portions of the media content item when the device plays the media content item.

15. The method of claim 1, the transmitting of the aggregated content tags to cause the device, after receiving the transmitted aggregated content tags, to replay one or more portions of the media content item when the device plays the media content item.

16. The method of claim 1, the transmitting of the aggregated content tags to cause the device, after receiving the transmitted aggregated content tags, to present an alert during one or more portions of the media content item when the device plays the media content item.

17. The method of claim 1, wherein the first type is a different type from the second type.

18. The method of claim 1, wherein the location within the media content item for each content tag is a location for a portion of the media content item for which playback is to be modified.

19. A method comprising:
presenting, by a device, a media content item for viewing;
receiving, at the device, a series of inputs from a viewer during the presenting of the media content item;
storing, by one or more hardware processors, an entry in a database for each input of at least a subset of the inputs, each entry comprising a location within the media content item and a tag indication that indicates whether the location is of a first type or a second type; and transmitting, from the device over a communication network to a computing system, a plurality of content tags, each of the plurality of content tags comprising the location within the media content item of an entry in the database and the tag indication of the entry in the database, the transmitting of the plurality of content tags causing the computer system to perform operations comprising:
  identifying a first group of content tags based on the tag indication of each content tag in the first group of content tags indicating that the location of the content tag is of the first type;
  generating a first aggregated content tag based on aggregating the first group of content tags, the first aggregated content tag comprising a first aggregated location within the media content item, the generating of the first aggregated content tag comprising: setting, based on a first location designated by a first content tag in the first group of content tags being an earliest location among all locations for content tags in the first group of content tags, the first aggregated content tag to designate the first location;
  identifying a second group of content tags based on the tag indication of each content tag of the second group of content tags indicating that the location of the content tag is of the second type; and
  generating a second aggregated content tag based on aggregating the second group of content tags, the second aggregated content tag comprising a second aggregated location within the media content item, the generating of the second aggregated content tag comprising: setting, based on a second location designated by a second content tag of the second group of content tags being an latest location among all locations for content tags in the second group of content tags, the second aggregated content tag to designate the second location.

20. The method of claim 19, the series of inputs comprising tagging input provided by the viewer while the media content item is played live to the viewer.

21. The method of claim 19, the series of inputs comprising playback trick mode inputs provided by the viewer while the media content item is played back to the viewer.

22. The method of claim 19, further comprising:
  receiving, from the computing system via the communication network at the device, a second plurality of content tags designating one or more portions of a second media content item for modified playback; and
  controlling playback, by the device, of the second media content item based on the second plurality of content tags.

23. The method of claim 22, further comprising:
  receiving, from the computing system via the communication network at the device, at least one of rating information and genre information corresponding to the one or more portions of the second media content item designated for modified playback by the second plurality of content tags; and
  accessing viewer preferences corresponding to at least one of ratings and genres of media content;
  wherein the controlling of the playback of the second media content item is further based on the viewer preferences and the at least one of the rating information and the genre information.

24. The method of claim 19, the device comprising a first device, the first aggregated content tag being one of a plurality of aggregated content tags, the transmitting of the plurality of content tags t to cause a second device separate from the device and the computer system to skip portions of the media content item designated by the aggregated content tags.

25. The method of claim 19, the device comprising a first device, the first aggregated content tag being one of a plurality of aggregated content tags, the transmitting of the plurality of content tags to cause a second device separate from the device and the computer system to mute portions of the media content item designated by the aggregated content tags.

26. The method of claim 19, the device comprising a first device, the first aggregated content tag being one of a plurality of aggregated content tags, the transmitting of the plurality of content tags to cause a second device separate from the device and the computer system to replay portions of the media content item designated by the aggregated content tags.

27. The method of claim 19, the device comprising a first device, the first aggregated content tag being one of a plurality of aggregated content tags, the transmitting of the plurality of content tags to cause a second device separate from the first device and the computer system to present an alert during portions of the media content item designated by the aggregated content tags.

28. A media system comprising:
  one or more hardware processors; and
  memory including instructions that, when executed by the one or more hardware processors, cause the media system to perform operations comprising:
    receiving, from a plurality of devices over a communication network, a plurality of content tags, each content tag in the plurality of content tags comprising a location within a media content item and a tag indication that indicates whether the location of the content tag is of a first type or a second type;
    identifying, using one or more hardware processors, based on the tag indication of each content tag in the plurality of content tags, a first group of content tags in the plurality of content tags, wherein the tag indication of each content tag in the first group of content tags indicates that the location for the content tag in the first group of content tags is of the first type;
    generating, using the one or more hardware processors, a first aggregated content tag based on aggregating the first group of content tags, the first aggregated content tag comprising a first aggregated location within the media content item, the generating of the first aggregated content tag comprising: setting, based on a first location for a first content tag of the first group of content tags being an earliest location among all locations for content tags in the first group of content tags, the first aggregated location to the first location;
    identifying, based on the tag indication of each content tag in the plurality of content tags, a second group of content tags in the plurality of content tags, wherein the tag indication of each content tag of the second group of content tags indicates that the location for the content tag in the second group of content tags is of the second type;
    generating a second aggregated content tag based on aggregating the second group of content tags, the second aggregated content tag designating a second aggregated location within the media content item, the generating of the second aggregated content tag comprising: setting, based on a second location for a second content tag of the second group of content tags being an latest location among all locations for content tans in the second group of content tags, the second aggregated location to the second location; and transmitting, over the communication network to a device not included in the plurality of devices, the first aggregated content tag and the second aggregated content tag.

29. A device comprising:

one or more hardware processors; and memory including instructions that, when executed by the one or more hardware processors, cause the one or more hardware processors to perform operations comprising:

presenting a media content item for viewing;

receiving a series of inputs from a viewer during the presenting of the media content item;

storing an entry in a database for each input of at least a subset of the inputs, each entry comprising a location within the media content item and a tag indication that indicates whether the location is of a first type or a second type; and transmitting, over a communication network to a computing system, a plurality of content tags, each of the plurality of content tags comprising the location within the media content item of an entry in the database and the tag indication of the entry in the database, the transmitting of the plurality of content tags causing the computer system to perform operations comprising:

identifying a first group of content tags based on the tag indication of each content tag in the first group of content tags indicating that the location of the content tag is of the first type;

generating a first aggregated content tag based on aggregating the first group of content tags, the first aggregated content tag comprising a first aggregated location within the media content item, the generating of the first aggregated content tag comprising: setting, based on a first location designated by a first content tag in the first group of content tags being an earliest location among all locations for content tags in the first group of content tags, the first aggregated content tag to designate the first location;

identifying a second group of content tags based on the tag indication of each content tag of the second group of content tags indicating that the location of the content tag is of the second type; and generating a second aggregated content tag based on aggregating the second group of content tags, the second aggregated content tag comprising a second aggregated location within the media content item, the generating of the second aggregated content tag comprising: setting, based on a second location designated by a second content tag of the second group of content tags being an latest location among all locations for content tags in the second group of content tags, the second aggregated content tag to designate the second location.

30. The device of claim 29, the device comprising one of a set-top box, a mobile communication device, a desktop computer, a tablet computer, a streaming device, a smart television, and a gaming system.

* * * * *